(12) United States Patent
Koyama et al.

(10) Patent No.: US 10,481,429 B2
(45) Date of Patent: Nov. 19, 2019

(54) LIQUID-CRYSTAL VARIFOCAL LENS AND FOCAL LENGTH CONTROL METHOD

(71) Applicant: THE DOSHISHA, Kyoto (JP)

(72) Inventors: Daisuke Koyama, Kyoto (JP); Yuki Shimizu, Kyoto (JP)

(73) Assignee: THE DOSHISHA, Kyoto (JP)

( * ) Notice: Subject to any disclaimer, the term of this patent is extended or adjusted under 35 U.S.C. 154(b) by 147 days.

(21) Appl. No.: 15/711,445

(22) Filed: Sep. 21, 2017

(65) Prior Publication Data

US 2018/0157107 A1 Jun. 7, 2018

(30) Foreign Application Priority Data

Dec. 6, 2016 (JP) .................................. 2016-236802

(51) Int. Cl.
| | | |
|---|---|---|
| *G02F 1/29* | (2006.01) | |
| *G02F 1/11* | (2006.01) | |
| *B06B 1/06* | (2006.01) | |
| *G02F 1/133* | (2006.01) | |
| *G02F 1/1335* | (2006.01) | |

(52) U.S. Cl.
CPC .......... *G02F 1/133526* (2013.01); *B06B 1/06* (2013.01); *G02F 2001/294* (2013.01)

(58) Field of Classification Search
None
See application file for complete search history.

(56) References Cited

U.S. PATENT DOCUMENTS

2018/0329238 A1* 11/2018 Koyama .................. G02F 1/13
2019/0018169 A1* 1/2019 Aschwanden ......... G02B 7/028

FOREIGN PATENT DOCUMENTS

| JP | 2001-257932 | 9/2001 |
|---|---|---|
| JP | 2009-080152 | 4/2009 |

* cited by examiner

*Primary Examiner* — Edward J Glick
*Assistant Examiner* — Anthony G Quash
(74) *Attorney, Agent, or Firm* — Greenblum & Bernstein, P.L.C.

(57) ABSTRACT

A liquid-crystal varifocal lens includes a liquid crystal lens, and an ultrasonic transducer for generating an ultrasonic wave with a frequency that matches a resonant frequency of the liquid crystal lens. The ultrasonic transducer generates flexural oscillation in the liquid crystal lens such that the flexural oscillation has a vibration intensity decreasing continuously from the center to the circumference of a liquid crystal layer, whereby the thickness of the liquid crystal layer is changed, with the result that the orientation of the liquid crystal molecules is changed.

13 Claims, 5 Drawing Sheets

LIQUID-CRYSTAL VARIFOCAL LENS AND FOCAL LENGTH CONTROL METHOD

BACKGROUND OF THE INVENTION

1. Field of the Invention

The present invention relates to a liquid-crystal varifocal lens and a focal length control method.

2. Description of the Related Art

As one type of optical lens mounted in a camera module, a varifocal lens is known (see, for example, Japanese Laid-Open Patent Publication No. 2001-257932). The focal length of the varifocal lens described in Japanese Laid-Open Patent Publication No. 2001-257932 changes as a result of the lens shape being changed by a piezoelectric actuator. In the case where such a varifocal lens is mounted in a camera module, the thickness of the camera module can be reduced only to a limited degree due to the existence of the piezoelectric actuator.

As another type of optical lens, a liquid-crystal varifocal lens is known (see, for example, Japanese Laid-Open Patent Publication No. 2009-80152). The focal length of the liquid-crystal varifocal lens described in Japanese Laid-Open Patent Publication No. 2009-80152 changes as a result of the refractive index of a liquid crystal layer being changed by a voltage being applied to a transparent electrode. For the transparent electrode, indium tin oxide (ITO) is typically used. In the case where indium tin oxide (ITO) is used, there are problems, for example, in that indium, which is a rare metal, is contained, it is difficult to achieve both high transparency and low resistivity, and the technique to make a transparent electrode is difficult.

SUMMARY OF THE INVENTION

The present invention has been achieved under the above circumstances, with a problem thereof being to provide a liquid-crystal varifocal lens and a focal length control method which make it possible to achieve a thinner product and change a focal length without using a transparent electrode.

To solve the above problem, the present invention provides a liquid-crystal varifocal lens including a liquid crystal lens and an ultrasonic transducer. The liquid crystal lens includes a liquid crystal layer, a first substrate, and a second substrate. The liquid crystal layer is composed of liquid crystal molecules. The first substrate and the second substrate are disposed with the liquid crystal layer positioned therebetween. The ultrasonic transducer is disposed on either the first substrate or the second substrate, or both. The ultrasonic transducer generates an ultrasonic wave with a frequency that matches a resonant frequency of the liquid crystal lens, in accordance with an input voltage, whereby flexural oscillation is generated in the liquid crystal lens such that the flexural oscillation has a vibration intensity decreasing continuously from a center to a circumference of the liquid crystal layer, and a thickness of the liquid crystal layer is changed, thereby changing an orientation of the liquid crystal molecules.

The ultrasonic transducer may be disposed on the first substrate so as to be apart from the liquid crystal layer and the second substrate.

The liquid-crystal varifocal lens can be configured such that the first substrate is formed in a disk shape, the liquid crystal layer and the second substrate are formed in disk shapes each having a smaller diameter than the first substrate and being disposed at a center of the first substrate, and the ultrasonic transducer is formed in an annular shape with an inner diameter larger than a diameter of each of the liquid crystal layer and the second substrate but smaller than a diameter of the first substrate, the ultrasonic transducer being disposed on the first substrate with an opening accommodating the liquid crystal layer and the second substrate.

The ultrasonic transducer may be disposed on each of the first substrate and the second substrate so as to sandwich the liquid crystal lens.

The liquid-crystal varifocal lens can be configured such that the liquid crystal lens is formed in a disk shape, and the ultrasonic transducer is formed in an annular shape with an opening positioned at a center of the liquid crystal lens.

Each of the first substrate and the second substrate may be a film material.

The ultrasonic transducer may have electrode patterns formed in circumferential divisions.

Preferably, the flexural oscillation generated in the liquid crystal lens by the ultrasonic transducer is first-order-mode flexural oscillation.

The liquid crystal layer may be a nematic liquid crystal layer.

To solve the above problem, the present invention provides a focal length control method for controlling a focal length of a liquid crystal lens with a liquid crystal layer provided between a first substrate and a second substrate. The method includes applying an input voltage to an ultrasonic transducer disposed on the liquid crystal lens to generate an ultrasonic wave with a frequency that matches a resonant frequency of the liquid crystal lens, whereby flexural oscillation is generated in the liquid crystal lens such that the flexural oscillation has a vibration intensity decreasing continuously from a center to a circumference of the liquid crystal layer, and a thickness of the liquid crystal layer is changed, thereby changing an orientation of the liquid crystal molecules.

In the focal length control method, preferably, an amplitude value of the input voltage is changed while keeping the frequency of the input voltage constant.

In the focal length control method, the frequency of the input voltage may be fixed to such a value that the flexural oscillation generated in the liquid crystal lens is first-order-mode flexural oscillation.

In the focal length control method, the ultrasonic transducer may have electrode patterns formed in circumferential divisions, whereby the input voltage applied to some of the divisions has an amplitude value different from an amplitude value of the input voltage applied to some other of the divisions, thereby laterally shifting a focal position of the liquid crystal lens.

The present invention renders it possible to provide a liquid-crystal varifocal lens and a focal length control method which make it possible to achieve a thinner product and change a focal length without using a transparent electrode.

DETAILED DESCRIPTION OF THE PREFERRED EMBODIMENTS

Figure 1A:
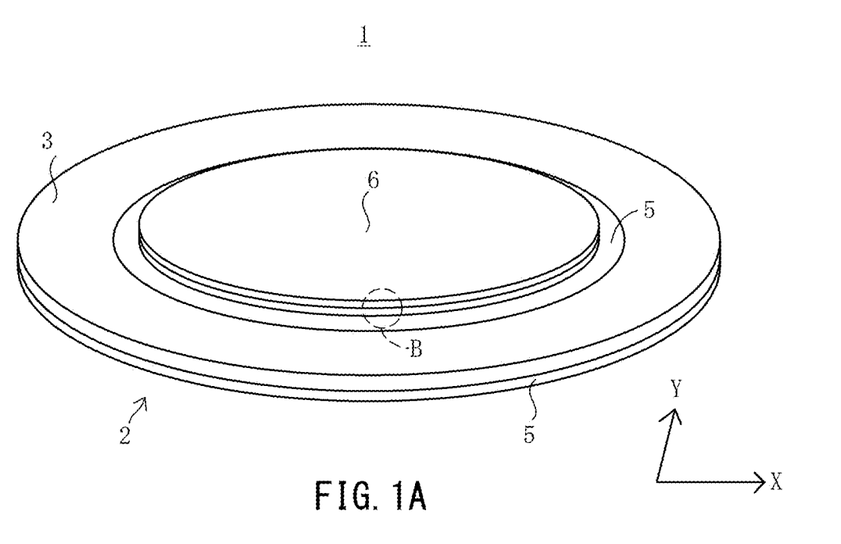
FIG. 1A is a view illustrating a liquid-crystal varifocal lens according to a first embodiment.
Figure 1B:
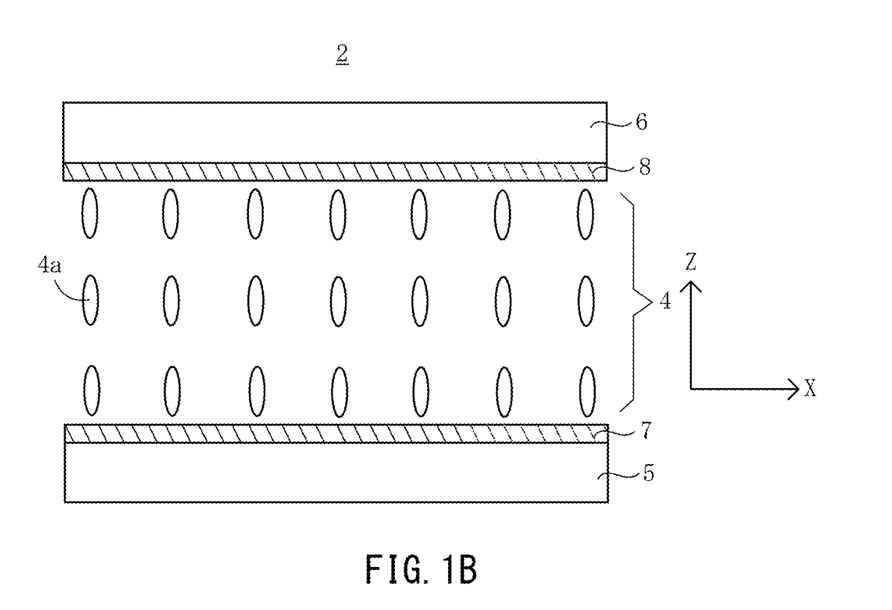
FIG. 1B is an enlarged view of a circled portion B in FIG. 1A.

Hereinafter, embodiments of a liquid-crystal varifocal lens and a focal length control method according to the present invention will be described with reference to the accompanying drawings. In the following embodiments, the Z-axis direction in FIG. 1 corresponds to the thickness direction.

First Embodiment

Liquid-Crystal Varifocal Lens

FIG. 1A illustrates a liquid-crystal varifocal lens 1 according to a first embodiment of the present invention. The liquid-crystal varifocal lens 1 includes a liquid crystal lens 2 formed in a disk shape and an ultrasonic transducer 3 formed in an annular shape.

As shown in FIG. 1B, the liquid crystal lens 2 includes a liquid crystal layer 4, as well as a first glass substrate 5 (corresponding to the "first substrate" of the present invention) and a second glass substrate 6 (corresponding to the "second substrate" of the present invention), which are disposed opposite each other with the liquid crystal layer 4 positioned therebetween. The first glass substrate 5 and the second glass substrate 6 are respectively provided with alignment films 7 and 8 on respective surfaces on the liquid crystal layer 4 side.

The first glass substrate 5 is formed in a disk shape with a diameter of 40 millimeters [mm] and a thickness of 0.7 mm. The second glass substrate 6 is formed in a disk shape with a diameter of 25 mm and a thickness of 0.7 mm. Formed between the first glass substrate 5 and the second glass substrate 6 is the liquid crystal layer 4 with a thickness of 50 micrometers [μm].

The liquid crystal layer 4 is composed of nematic liquid crystal molecules 4a with a negative dielectric anisotropy. The liquid crystal layer 4 is ensured to have a thickness of 50 μm by a spacer (e.g., a PET film). The liquid crystal layer 4 is sealed therearound by epoxy resin.

The alignment films 7 and 8 are a top and bottom pair of homeotropic alignment films which cause the liquid crystal molecules 4a to have a pretilt angle of 90 degrees. The alignment films 7 and 8 are made of a polyimide-based material. The liquid crystal layer 4 is sandwiched between the alignment films 7 and 8, with the result that the liquid crystal molecules 4a stand upright to the alignment films 7 and 8 when the ultrasonic transducer 3 is not generating an ultrasonic wave (see FIG. 1B).

As shown in FIG. 1A, the liquid crystal layer 4 and the second glass substrate 6 are disposed on the center area of the first glass substrate 5. Disposed on the circumferential area of the first glass substrate 5 is the annular ultrasonic transducer 3.

The ultrasonic transducer 3 is formed in an annular shape with an inner diameter of 30 mm, an outer diameter of 40 mm, and a thickness of 1 mm. The ultrasonic transducer 3 is an annular piezoelectric ultrasonic transducer made with lead zirconate titanate (PZT). The ultrasonic transducer 3 is firmly fixed to the first glass substrate 5 by an adhesive means, such as epoxy resin, apart from the liquid crystal layer 4 and the second glass substrate 6 in such a manner that the opening accommodates the liquid crystal layer 4 and the second glass substrate 6.

Figure 2A:
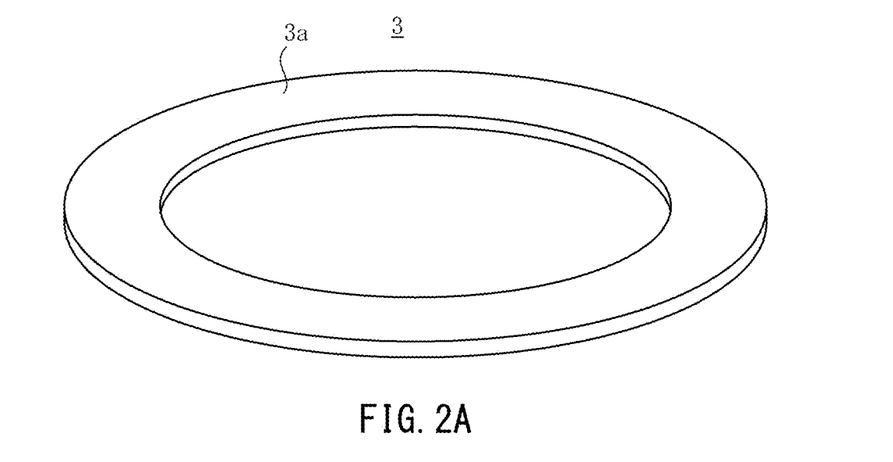
FIG. 2A is a view illustrating the bottom side of an ultrasonic transducer according to the first embodiment.
Figure 2B:
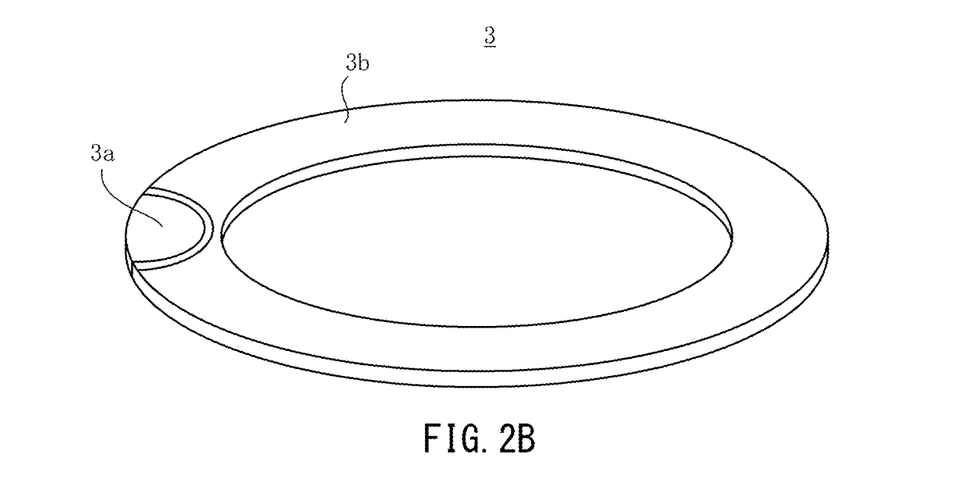
FIG. 2B is a view illustrating the top side of the ultrasonic transducer according to the first embodiment.

The ultrasonic transducer 3 has a negative electrode 3a formed of aluminum on the bottom side (i.e., on the first glass substrate 5 side), as shown in FIG. 2A. On the top side of the ultrasonic transducer 3 are a part of the negative electrode 3a that is folded back from the bottom side and a positive electrode 3b formed of aluminum, as shown in FIG. 2B. The negative electrode 3a and the positive electrode 3b are insulated from each other.

The ultrasonic transducer 3 generates an ultrasonic wave in accordance with an alternating-current input voltage applied to the positive electrode 3b and the negative electrode 3a. In the present embodiment, the ultrasonic transducer 3 generates an ultrasonic wave with a frequency that matches a resonant frequency of the liquid crystal lens 2.

Once an ultrasonic wave with a frequency that matches a resonant frequency of the liquid crystal lens 2 propagates to the liquid crystal lens 2, flexural oscillation occurs in the liquid crystal lens 2. The flexural oscillation refers to oscillation whose vibration intensity decreases continuously from the center to the circumference of the liquid crystal layer 4. The flexural oscillation is categorized into first-order mode and high-order, i.e., second or higher-order, mode.

When flexural oscillation occurs in the liquid crystal lens 2, an acoustic standing wave in accordance with the flexural oscillation is generated in the liquid crystal layer 4. An acoustic radiation force (static pressure) acts on the interface between the liquid crystal layer 4 and the first glass substrate 5 (i.e., the alignment film 7), the interface between the first glass substrate 5 and the air, the interface between the liquid crystal layer 4 and the second glass substrate 6 (i.e., the alignment film 8), and the interface between the second glass substrate 6 and the air. The acoustic radiation force slightly changes the thickness of the liquid crystal layer 4.

In the present embodiment, the thickness of the liquid crystal layer 4 increases. More specifically, the first glass substrate 5 is displaced downwards, and the second glass substrate 6 is displaced upwards. The relationship between the displacement of the first glass substrate 5 and the displacement of the second glass substrate 6 is not vertically symmetrical, and the displacement of either one is larger.

Figure 3:
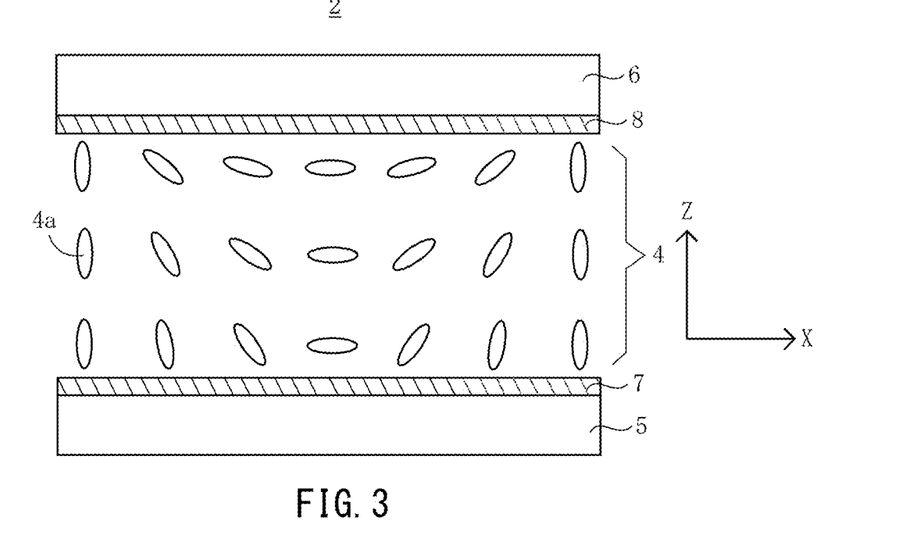
FIG. 3 is a diagram showing an example of the orientation of liquid crystal molecules in the first embodiment where there is flexural oscillation.

Once the thickness of the liquid crystal layer 4 changes, the orientation of the liquid crystal molecules 4a changes. Since the thickness change of the liquid crystal layer 4 decreases continuously from the center to the circumference of the liquid crystal layer 4, the orientation change of the liquid crystal molecules 4a also decreases continuously from the center to the circumference of the liquid crystal layer 4. Moreover, the acoustic radiation force acts on the interfaces and changes continuously in the thickness direction of the liquid crystal layer 4, and therefore, the orientation of the liquid crystal molecules 4a also changes continuously in the thickness direction of the liquid crystal layer 4. FIG. 3 shows an example of the orientation change of the liquid crystal molecules 4a due to the acoustic radiation force. FIG. 3 shows only the orientation change of the liquid crystal molecules 4a and does not show the thickness change of the liquid crystal layer 4.

As described above, the orientation of the liquid crystal molecules 4a changes continuously not only from the center to the circumference of the liquid crystal layer 4 but also in the thickness direction of the liquid crystal layer 4. Accordingly, the liquid crystal layer 4 functions as a lens whose refractive index changes spatially to form a focal point.

Furthermore, the ultrasonic transducer 3 changes the frequency of the ultrasonic wave when the frequency of the input voltage changes, and further, the ultrasonic transducer 3 also changes the vibration intensity of the ultrasonic wave when the amplitude value of the input voltage changes. Accordingly, the ultrasonic transducer 3 can change the focal length of the liquid crystal lens 2, for example, by keeping the frequency of the input voltage constant and changing the amplitude value of the input voltage.

To sum up, the liquid-crystal varifocal lens 1 generates flexural oscillation in the liquid crystal lens 2 by means of the ultrasonic transducer 3, thereby changing the thickness of the liquid crystal layer 4. Accordingly, the liquid-crystal varifocal lens 1 can be reduced in thickness because there is no need for a mechanically movable portion (e.g., a piezoelectric actuator) for changing the lens shape. Moreover, the focal length of the liquid-crystal varifocal lens 1 can be changed without using a transparent electrode.

Focal Length Control Method

Next, a focal length control method according to the present embodiment will be described.

The focal length control method according to the present embodiment is a method for controlling the focal length of the liquid crystal lens 2 using the ultrasonic transducer 3. More specifically, in the focal length control method according to the present embodiment, the ultrasonic transducer 3 generates an ultrasonic wave with a frequency that matches a resonant frequency of the liquid crystal lens 2, with the result that the ultrasonic wave propagates to the liquid crystal lens 2.

To this end, it is preferable to determine in advance the frequency of an input voltage to be applied to the ultrasonic transducer 3. The frequency of the input voltage can be calculated through simulation on the basis of the physical properties of the ultrasonic transducer 3, the first glass substrate 5, and the second glass substrate 6 (e.g., the Young's moduli, Poisson's ratios, and densities of the first glass substrate 5 and the second glass substrate 6, as well as the elastic constant matrix, density, and piezoelectric constant matrix of the ultrasonic transducer 3).

Once an ultrasonic wave with a frequency that matches a resonant frequency of the liquid crystal lens 2 propagates to the liquid crystal lens 2, flexural oscillation occurs in the liquid crystal lens 2, and an acoustic standing wave in accordance with the flexural oscillation is generated in the liquid crystal layer 4.

In addition, an acoustic radiation force (static pressure) acts on the interface between the liquid crystal layer 4 and the first glass substrate 5 (i.e., the alignment film 7), the interface between the first glass substrate 5 and the air, the interface between the liquid crystal layer 4 and the second glass substrate 6 (i.e., the alignment film 8), and the interface between the second glass substrate 6 and the air. The acoustic radiation force slightly changes the thickness of the liquid crystal layer 4.

The thickness change of the liquid crystal layer 4 decreases continuously from the center to the circumference of the liquid crystal layer 4. Accordingly, the orientation change of the liquid crystal molecules 4a also decreases continuously from the center to the circumference of the liquid crystal layer 4. Moreover, the acoustic radiation force acts on the interfaces and changes continuously in the thickness direction of the liquid crystal layer 4. Therefore, the orientation of the liquid crystal molecules 4a also changes continuously in the thickness direction of the liquid crystal layer 4. Thus, the liquid crystal layer 4 functions as a lens for forming a focus.

Furthermore, in the focal length control method according to the present embodiment, the amplitude value of an input voltage applied to the ultrasonic transducer 3 may be changed while keeping the frequency of the input voltage constant. In the case where there is flexural oscillation in the liquid crystal lens 2, the focal length can be shortened by increasing the amplitude value of the input voltage, or the focal length can be increased by decreasing the amplitude value of the input voltage.

To sum up, the focal length control method according to the present embodiment renders it possible to control the focal length of the liquid crystal lens 2 by changing the thickness of the liquid crystal layer 4 by means of the ultrasonic transducer 3. Therefore, the focal length control method according to the present embodiment eliminates the need to provide the liquid crystal lens 2 with a mechanically movable portion (e.g., a piezoelectric actuator) for changing the lens shape, with the result that the liquid crystal lens 2 can be reduced in thickness. Moreover, the focal length control method according to the present embodiment renders it possible to change the focal length without using a transparent electrode in the liquid crystal lens 2.

Evaluation Experiment

Next, an evaluation experiment on the liquid-crystal varifocal lens 1 will be described. In the evaluation experiment, an input voltage (continuous sinusoidal voltage) with a peak-to-peak value Vpp of 5V was applied to the ultrasonic transducer 3.

Figure 4A:
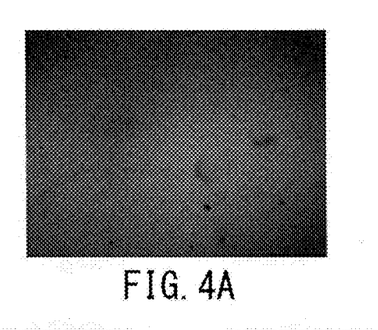
FIG. 4A is an image showing a retardation change where no ultrasonic wave is being generated.
Figure 4B:
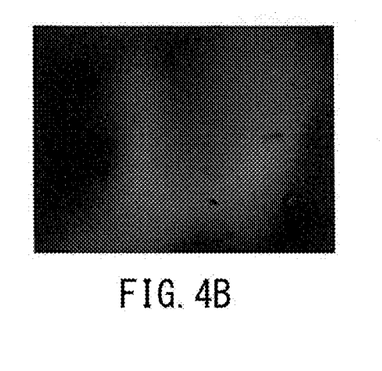
FIG. 4B is an image showing a retardation change where an ultrasonic wave with a frequency of 60 kHz is generated.
Figure 4C:
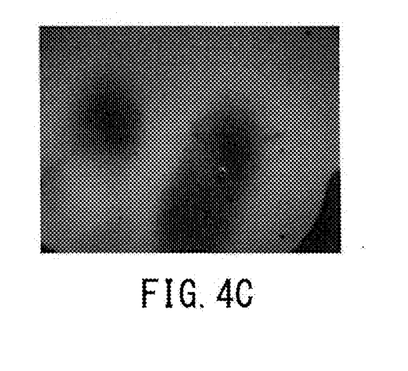
FIG. 4C is an image showing a retardation change where an ultrasonic wave with a frequency of 217 kHz is generated.

FIGS. 4A to 4C are images of the liquid crystal lens 2 (i.e., the top surface of the second glass substrate 6) where orthoscopic observation was performed under a polarizing microscope (a 5-power objective lens) using crossed-Nicol prisms. FIG. 4A is the image where the ultrasonic transducer 3 was not generating an ultrasonic wave, FIG. 4B is the image where the ultrasonic transducer 3 generated an ultrasonic wave with a frequency of 60 kHz, and FIG. 4C is the image where the ultrasonic transducer 3 generated an ultrasonic wave with a frequency of 217 kHz. These figures show retardation changes of the liquid crystal lens 2. Note that both the frequency of 60 kHz and the frequency of 217 kHz are resonant frequencies of the liquid crystal lens 2.

As shown in FIG. 4A, when the ultrasonic transducer 3 is not generating an ultrasonic wave, the liquid crystal molecules 4a are oriented vertically by means of the alignment films 7 and 8, and there is no change in the refractive index in the in-plane direction, resulting in a generally dark image. On the other hand, in FIGS. 43 and 4C, changes in color tone due to retardation change can be seen in the images. From the images in FIGS. 4B and 4C, it can be appreciated that the orientation of the liquid crystal molecules 4a was changed by the ultrasonic waves.

Figure 5A:
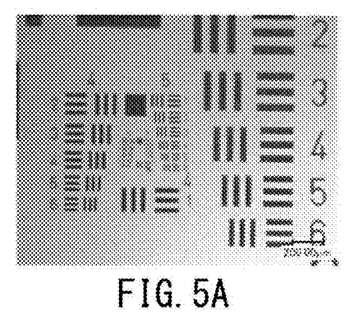
FIGS. 5A and 5B are images showing the appearance of a test target where no ultrasonic wave is being generated.
Figure 5B:
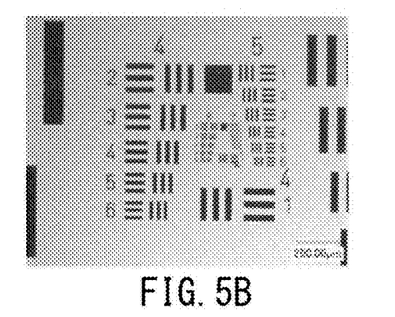
Figure 5C:
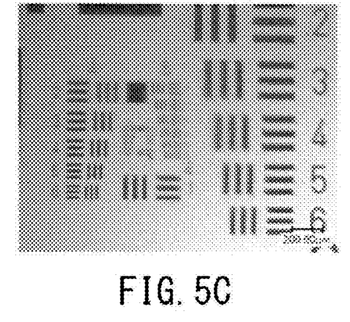
FIG. 5C is an image showing the appearance of the test target where an ultrasonic wave with a frequency of 60 kHz is generated.
Figure 5D:
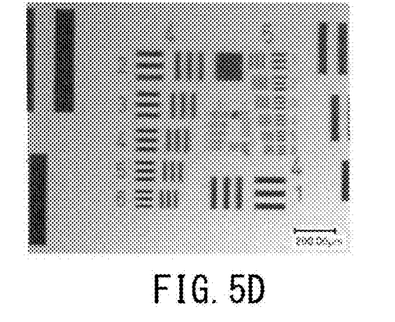
FIG. 5D is an image showing the appearance of the test target where an ultrasonic wave with a frequency of 217 kHz is generated.

FIGS. 5A to 5D are images of a test target where observation was performed under an optical microscope using a single Nicol prism. In this single-Nicol observation, the liquid-crystal varifocal lens 1 and a polarizer were interposed between the optical microscope and the test target. FIGS. 5A and 5B are images where the ultrasonic transducer 3 was not generating an ultrasonic wave, FIG. 5C is an image where the ultrasonic transducer 3 generated an ultrasonic wave with a frequency of 60 kHz, and FIG. 5D is an image where the ultrasonic transducer 3 generated an ultrasonic wave with a frequency of 217 kHz. Note that the optical microscope was focused in advance on the surface of the test target when the ultrasonic transducer 3 was not generating an ultrasonic wave.

When compared to the image in FIG. 5A, the image in FIG. 5C is blurry, and therefore, it can be appreciated that the ultrasonic wave changed the focal position. Similarly, when compared to the image in FIG. 5B, the image in FIG. 5D is blurry, and therefore, it can be appreciated that the ultrasonic wave changed the focal position. These results show that the orientation of the liquid crystal molecules 4a changed continuously in the thickness direction of the liquid crystal layer 4.

Figure 6A:
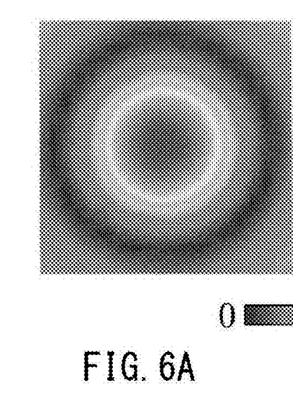
FIG. 6A is an image showing vibration intensities across the top surface of the liquid crystal lens where an ultrasonic wave with a frequency of 60 kHz is generated.
Figure 6B:
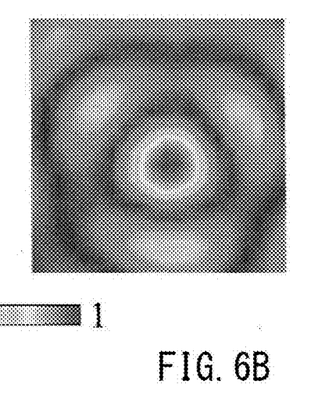
FIG. 6B is an image showing vibration intensities across the top surface of the liquid crystal lens where an ultrasonic wave with a frequency of 217 kHz.

FIGS. 6A and 6B are images showing vibration intensity distribution across the top surface of the second glass substrate 6, as observed using a laser Doppler vibrometer (LDV). FIG. 6A is an image where the ultrasonic transducer 3 generated an ultrasonic wave with a frequency of 60 kHz, and FIG. 6B is an image where the ultrasonic transducer 3 generated an ultrasonic wave with a frequency of 217 kHz.

From FIGS. 6A and 6B, it can be appreciated that flexural oscillation was generated in the liquid crystal lens 2. Moreover, it can also be appreciated that the vibration intensity of the flexural oscillation decreased continuously from the center to the circumference of the second glass substrate 6. These results show that the orientation change of the liquid crystal molecules 4a decreased continuously from the center to the circumference of the liquid crystal layer 4. The flexural oscillation in FIG. 6A is first-order-mode flexural oscillation. The flexural oscillation in FIG. 6B is high-order-mode (second-order-mode) flexural oscillation.

As can be appreciated from FIGS. 6A and 6B, the wavelength of the flexural oscillation decreases as the frequency of the ultrasonic wave increases. The lens diameter (the area that functions as the lens) decreases as the frequency of the ultrasonic wave increases. In other words, the lens diameter can be larger when first-order-mode flexural oscillation is generated than when high-order-mode flexural oscillation is generated.

Furthermore, as can be appreciated from FIGS. 4A and 43, the rate of changes in color tone due to retardation change also decreases as the frequency of the ultrasonic wave increases. This result shows that there is a correlation between flexural oscillation and retardation change.

Second Embodiment

Liquid-Crystal Varifocal Lens

Figure 7:
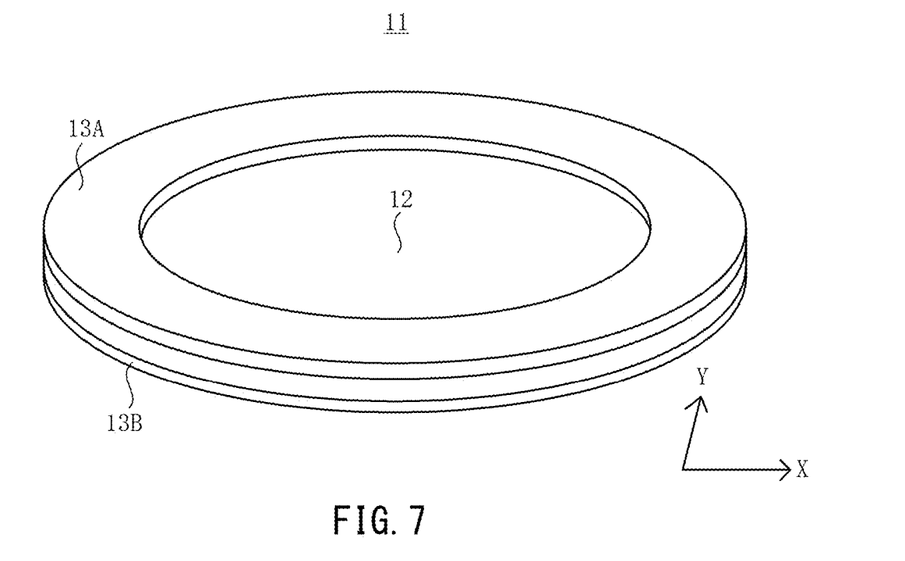
FIG. 7 is a view illustrating a liquid-crystal varifocal lens according to a second embodiment.

FIG. 7 illustrates a liquid-crystal varifocal lens 11 according to a second embodiment of the present invention. The liquid-crystal varifocal lens 11 differs from the first embodiment in that a pair of ultrasonic transducers 13A and 13B are included.

The liquid-crystal varifocal lens 11 includes a liquid crystal lens 12 formed in a disk shape. The liquid crystal lens includes a liquid crystal layer as well as a first glass substrate and a second glass substrate, which are disposed opposite each other with the liquid crystal layer positioned therebetween. The liquid crystal lens 12 is the same as the liquid crystal lens 2 in the first embodiment, except that the first glass substrate and the second glass substrate are in the same size.

The ultrasonic transducers 13A and 13B are the same as the ultrasonic transducer 3 in the first embodiment, except for position. The ultrasonic transducer 13A is formed in an annular shape and disposed on a top surface of the liquid crystal lens 12 (i.e., on a top surface of the second glass substrate). The ultrasonic transducer 13B is formed in an annular shape similar to the ultrasonic transducer 13A, and disposed on a bottom surface of the liquid crystal lens 12 (i.e., on a bottom surface of the first glass substrate). The ultrasonic transducers 13A and 13B have openings at the center of the liquid crystal lens 12.

The ultrasonic transducers 13A and 13B generate ultrasonic waves having a frequency that matches a resonant frequency of the liquid crystal lens 12, in accordance with input voltages. Once the ultrasonic waves propagate to the liquid crystal lens 12, flexural oscillation is generated in the liquid crystal lens 12. As a result, the thickness of the liquid crystal layer slightly changes (e.g., increases), thereby changing the orientation of the liquid crystal molecules.

Accordingly, the liquid-crystal varifocal lens 11 dispenses with a mechanically movable portion (e.g., a piezoelectric actuator) for changing the lens shape, and therefore, can be reduced in thickness. Moreover, the focal length of the liquid-crystal varifocal lens 12 can be changed without using a transparent electrode.

Furthermore, since the liquid-crystal varifocal lens 11 includes the two ultrasonic transducers 13A and 13B, the focal length can be changed with lower power consumption when compared to the first embodiment.

Focal Length Control Method

Next, a focal length control method according to the present embodiment will be described. The focal length control method according to the present embodiment is a method for controlling the focal length of the liquid crystal lens 12 using the ultrasonic transducers 13A and 13B.

In the focal length control method according to the present embodiment, first, input voltages having the same frequency are applied to the ultrasonic transducers 13A and 13B, and both the ultrasonic transducers 13A and 13B generate common ultrasonic waves (i.e., ultrasonic waves having a frequency that matches a resonant frequency of the liquid crystal lens 12).

The ultrasonic waves propagate to the liquid crystal lens 12. In the liquid crystal lens 12, flexural oscillation is generated. An acoustic standing wave in accordance with the flexural oscillation is generated in the liquid crystal layer, whereby the thickness of the liquid crystal layer slightly changes, with the result that the orientation of the liquid crystal molecules changes.

The amplitude value of the input voltages applied to the ultrasonic transducers 13A and 13B may be changed while keeping the frequency of the input voltages constant. The focal length can be shortened by increasing the amplitude value of the input voltages, or the focal length can be increased by decreasing the amplitude value of the input voltages.

To sum up, the focal length control method according to the present embodiment eliminates the need to provide the liquid crystal lens 12 with a mechanically movable portion (e.g., a piezoelectric actuator) for changing the lens shape, with the result that the liquid crystal lens 12 can be reduced in thickness. Moreover, the focal length control method according to the present embodiment renders it possible to change the focal length without using a transparent electrode in the liquid crystal lens 12.

Furthermore, since the focal length control method according to the present embodiment uses the two ultrasonic transducers 13A and 13B, the focal length can be changed with lower power consumption when compared to the first embodiment.

While the embodiments of the liquid-crystal varifocal lens and the focal length control method according to the present invention have been described above, the present invention is not limited to the embodiments.

In the case of the liquid crystal lens 2 (or the liquid crystal lens 12), the structures, shapes, sizes, materials, etc., of the liquid crystal layer 4, the first glass substrate 5, and the second glass substrate 6 can be suitably changed so long as flexural oscillation is generated by the ultrasonic transducer 3 (or the ultrasonic transducers 13A and 13B), thereby changing the thickness of the liquid crystal layer 4. For example, the liquid crystal layer 4 may be composed of liquid crystal molecules other than the nematic liquid crystals whose dielectric anisotropy is negative. In place of the first glass substrate 5 and the second glass substrate 6, film materials such as polymer films may be used.

The liquid crystal lens 2 (or the liquid crystal lens 12) may be in the shape of, for example, a polygon when viewed in a plan view.

The structure, shape, size, material, etc., of the ultrasonic transducer 3 (or the ultrasonic transducers 13A and 13B) can be suitably changed so long as an ultrasonic wave(s) having a frequency that matches a resonant frequency of the liquid crystal lens 2 (or the liquid crystal lens 12) can be generated. For example, in the case where film materials are used as first and second substrates, the ultrasonic transducer 3 may be formed on the film materials by some method such as sputtering.

The ultrasonic transducer 3 (or the ultrasonic transducers 13A and 13B) can be disposed in an arbitrary position(s) on the liquid crystal lens 2 (or the liquid crystal lens 12) so long as flexural oscillation can be generated in the liquid crystal lens 2 (or the liquid crystal lens 12).

Figure 8:
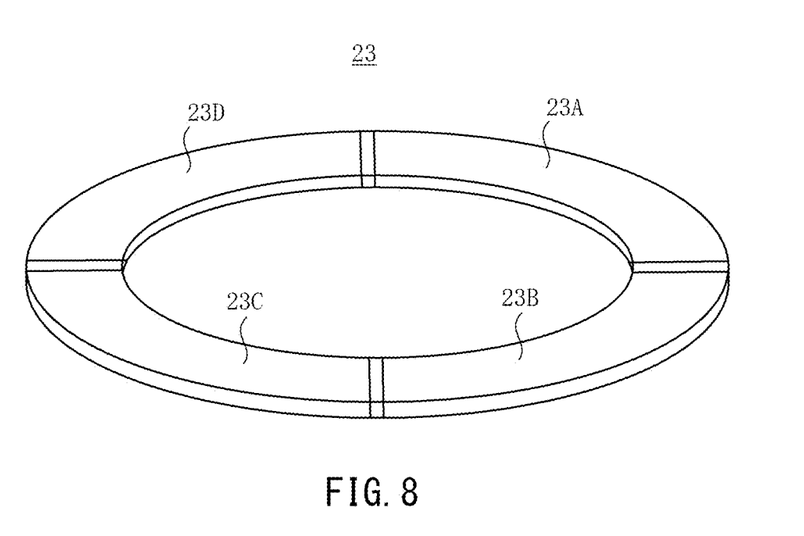
FIG. 8 is a view illustrating the bottom side of an ultrasonic transducer according to a variant.

The ultrasonic transducer 3 (or the ultrasonic transducers 13A and 13B) can be divided into electrode patterns (negative and positive electrodes) which are disposed so as to be electrically insulated from each other. For example, it is possible to use an ultrasonic transducer 23 with four circumferentially divided electrode patterns, as shown in FIG. 8. The ultrasonic transducer 23 has electrode patterns (negative and positive electrodes) which are similar to those in the embodiments and formed in the circumferential divisions, i.e., sections 23A to 23D. The electrode patterns in the sections 23A to 23D are insulated from one another.

In the case of the ultrasonic transducer 23, the amplitude value of an input voltage applied to some of the sections 23A to 23D is different from the amplitude value of an input voltage applied to some other of the sections 23A to 23D, with the result that the focal position of the liquid crystal lens 2 or 12 can be shifted laterally (in the X-axis direction and/or the Y-axis direction). For example, the amplitude value of an input voltage applied to the electrode patterns in the sections 23A and 23B is set (e.g., to 0) lower than the amplitude value of an input voltage applied to the electrode patterns in the sections 23C and 23D, so that the focal position of the liquid crystal lens 2 or 12 can be shifted laterally (e.g., leftward in FIG. 8) from the center.

The ultrasonic transducer 23 can be applied to the image stabilization function for use in typical cameras. In the case of conventional and typical cameras, the image stabilization function is realized by a mechanically movable portion moving a lens in a mechanical manner. On the other hand, in the case of the liquid-crystal varifocal lens including the ultrasonic transducer 23, the image stabilization function can be realized by controlling input voltages to shift the focal position laterally, as described earlier. That is, the liquid-crystal varifocal lens including the ultrasonic transducer 23 eliminates the need for the mechanically movable portion, and enhances robustness. Note that the ultrasonic transducer 23 has four divided electrode patterns, but the transducer itself may be physically divided into four (i.e., four transducers may be provided).

For the top and bottom pair of alignment films 7 and 8, films other than the homeotropic alignment films can be used. For example, as the alignment films 7 and 8, horizontal alignment films may be used so that, when the ultrasonic transducer 3 is not generating an ultrasonic wave, the liquid crystal molecules 4a are oriented horizontally to the alignment films 7 and 8. In this case, once the ultrasonic transducer 3 generates an ultrasonic wave, some liquid crystal molecules 4a stand upright so that the refractive index of the liquid crystal layer 4 changes spatially. Moreover, the homeotropic alignment film may be used as one of the alignment films 7 and 8, and the horizontal alignment film may be used as the other.

What is claimed is:

1. A liquid-crystal varifocal lens comprising:
    a liquid crystal lens including a liquid crystal layer composed of liquid crystal molecules as well as a first substrate and a second substrate disposed with the liquid crystal layer positioned therebetween; and
    an ultrasonic transducer disposed on either the first substrate or the second substrate, or both, wherein,
    the ultrasonic transducer generates an ultrasonic wave with a frequency that matches a resonant frequency of the liquid crystal lens, in accordance with an input voltage, whereby,
    flexural oscillation is generated in the liquid crystal lens such that the flexural oscillation has a vibration intensity decreasing continuously from a center to a circumference of the liquid crystal layer, and
    a thickness of the liquid crystal layer is changed, thereby changing an orientation of the liquid crystal molecules.

2. The liquid-crystal varifocal lens according to claim 1, wherein the ultrasonic transducer is disposed on the first substrate so as to be apart from the liquid crystal layer and the second substrate.

3. The liquid-crystal varifocal lens according to claim 2, wherein,
    the first substrate is formed in a disk shape,
    the liquid crystal layer and the second substrate are formed in disk shapes each having a smaller diameter than the first substrate and being disposed at a center of the first substrate, and
    the ultrasonic transducer is formed in an annular shape with an inner diameter larger than a diameter of each of the liquid crystal layer and the second substrate but smaller than a diameter of the first substrate, the ultrasonic transducer being disposed on the first substrate with an opening accommodating the liquid crystal layer and the second substrate.

4. The liquid-crystal varifocal lens according to claim 1, wherein the ultrasonic transducer is disposed on each of the first substrate and the second substrate so as to sandwich the liquid crystal lens.

5. The liquid-crystal varifocal lens according to claim 4, wherein,
the liquid crystal lens is formed in a disk shape, and
the ultrasonic transducer is formed in an annular shape with an opening positioned at a center of the liquid crystal lens.

6. The liquid-crystal varifocal lens according to claim 1, wherein each of the first substrate and the second substrate is a film material.

7. The liquid-crystal varifocal lens according to claim 1, wherein the ultrasonic transducer has electrode patterns formed in circumferential divisions.

8. The liquid-crystal varifocal lens according to claim 1, wherein the flexural oscillation generated in the liquid crystal lens by the ultrasonic transducer is first-order-mode flexural oscillation.

9. The liquid-crystal varifocal lens according to claim 1, wherein the liquid crystal layer is a nematic liquid crystal layer.

10. A focal length control method for controlling a focal length of a liquid crystal lens with a liquid crystal layer provided between a first substrate and a second substrate, the method comprising applying an input voltage to an ultrasonic transducer disposed on the liquid crystal lens to generate an ultrasonic wave with a frequency that matches a resonant frequency of the liquid crystal lens, whereby,
flexural oscillation is generated in the liquid crystal lens such that the flexural oscillation has a vibration intensity decreasing continuously from a center to a circumference of the liquid crystal layer, and
a thickness of the liquid crystal layer is changed, thereby changing an orientation of the liquid crystal molecules.

11. The focal length control method according to claim 10, wherein an amplitude value of the input voltage is changed while keeping the frequency of the input voltage constant.

12. The focal length control method according to claim 11, wherein the frequency of the input voltage is fixed to such a value that the flexural oscillation generated in the liquid crystal lens is first-order-mode flexural oscillation.

13. The focal length control method according to claim 11, wherein,
the ultrasonic transducer has electrode patterns formed in circumferential divisions, whereby,
the input voltage applied to some of the divisions has an amplitude value different from an amplitude value of the input voltage applied to some other of the divisions, thereby laterally shifting a focal position of the liquid crystal lens.

* * * * *